United States Patent

Teishi

Patent Number: 5,618,608
Date of Patent: Apr. 8, 1997

[54] WEATHER STRIP

[75] Inventor: Minoru Teishi, Hiroshima, Japan

[73] Assignee: Nishikawa Rubber Co., Ltd., Hiroshima, Japan

[21] Appl. No.: 551,854

[22] Filed: Nov. 7, 1995

[30] Foreign Application Priority Data

Nov. 15, 1994 [JP] Japan .................................. 6-307034

[51] Int. Cl.⁶ ...................................................... E06B 7/16
[52] U.S. Cl. ......................... 428/122; 428/136; 49/490.1; 49/498.1
[58] Field of Search ................................... 428/122, 136, 428/358; 49/490.1, 498.1

[56] References Cited

U.S. PATENT DOCUMENTS 5,035,937  7/1991  Nozaki .................... 49/490.1

Primary Examiner—Alexander Thomas
Attorney, Agent, or Firm—Flynn, Thiel, Boutell & Tanis, P.C.

[57] ABSTRACT

A weather strip for sealing the joint between the door frame of the body of a car and a door put on the door frame comprises, in an integral structure, a welt part of a substantially U-shaped cross section to be put on a flange formed on the door frame, a hollow sealing part protruding from the outer side wall of the welt part, and a fish-bone or one-side core having a plurality of U-shaped loops and a linear connecting part successively connecting the U-shaped loops, and buffed in the welt part. Slots or cuts are formed in sections of the weather strip to be extended on the lower side of the door frame to cut out portions of the connecting part of the core so that breaks are formed in the connecting part of the core to make the section of the weather strip stretchable and contractible.

3 Claims, 8 Drawing Sheets

WEATHER STRIP

BACKGROUND OF THE INVENTION

1. Field of the Invention

The present invention relates to a weather strip for a car and, more specifically, to an improved door opening weather strip internally provided with a fish-bone or one side core for sealing the joint between a door frame of the body of a car and a door for closing an opening defined by the door frame.

2. Description of the Related Art

In most current automobiles, a main weather strip for sealing a door opening is attached to a door frame of a body instead of attaching the same to a door for closing a door opening defined by the door frame.

As shown in FIG. 2, a conventional main weather strip 20 to be attached to the flange 10 of the body of a car to seal a door opening is an integral structure having a welt part 21 of a generally U-shaped cross section, a hollow sealing part 22 protruding from the outer side wall of the welt part 21, a lip part 23 projecting from the inner side wall of the welt part 21, and a fish-bone core 30 buried in the welt part 21. As shown in FIG. 3, the fish-bone core 30 has a plurality of U-shaped loops 31 and a longitudinal connecting part 32 successively connecting the middle portions of the U-shaped loops 31. The core 30 buried in the welt part 21 enables the welt part 21 to be bent in conformity with the curved shape of the flange 10 and prevents the lips of the welt part 21 from warping. The connecting part 32 of the fish-bone core 30 affects adversely to the flexibility of the main weather strip 20 and makes work for setting the main weather strip 20 on the flange 10 of the body difficult, and the tolerance in the overall length of the main weather strip 20 is as small as from ±3 mm to ±4 mm.

As shown in FIG. 5, another conventional main weather strip 20 to be attached to the flange 10 of the body of a car to seal a door opening is an integral structure having a welt part 21 of a generally U-shaped cross section, a hollow sealing part 22 protruding from the outer side of the welt part 21 and provided with a drain hole 28, and a one-side core 30 buried in the welt part 21. As shown in FIG. 7, the one-side core 30 has a plurality of U-shaped loops 31 conforming to the shape of the welt part 21 and a longitudinal connecting part 35 successively connecting the leg portions of the U-shaped loops 31. The one-side core 30 is buried in the welt part 21 so that the connecting part 35 extends in the outer side wall of the welt part 21 contiguous with the hollow sealing part 22. The one-side core 30 is flexible but not stretchable because the U-shaped loops 31 of the one-side core 30 are connected by the connecting part 35, which makes work for attaching the main weather strip 20 to the body of a car.

SUMMARY OF THE INVENTION

Accordingly, it is an object of the present invention to provide a weather strip satisfactory in flexibility and stretchability, and capable of easily attached to the body of a car.

To achieve the above object, the weather strip for sealing the joint between the door frame of the body of a car and a door put on the door frame, according to a first aspect of the invention comprises, in an integral structure, a welt part of a substantially U-shaped cross section to be put on a flange formed on the door frame; a hollow sealing part protruding from the outer side wall of the welt part, a lip projecting from the inner side wall of the welt part, and a fish-bone core having a plurality of U-shaped loops and a linear connecting part successively connecting the middle portions of the U-shaped loops, and buried in the welt part with the connecting part thereof extended in the upper wall of the welt part, slots being punched in the upper wall of the welt part in a section of the weather strip to be extended on the lower side of the door frame to cut out portions of the connecting part of the fish-bone core so that breaks are formed in the connecting part of the fish-bone core.

A weather strip or sealing the joints between the door frame of the body of a car and a door put on the door frame, according to a second aspect of the invention, comprises, in an integral structure, a welt part of a substantially U-shaped cross section to be put on a flange formed on the door frame; a hollow sealing part protruding from the outer side wall of the welt part, a lip projecting from the inner side wall of the welt part, a molded weather strip joint disposed in a section of the weather strip to be extended on the lower side of the door frame; and a one-side core having a plurality of U-shaped loops and a linear connecting part successively connecting the leg portions of the U-shaped loops, and buried in the welt part with the connecting part thereof extended in the outer side wall of the welt part, cuts being formed in sections of the weather strip contiguous with the opposite ends of the molded weather strip joint, respectively, and extended on the lower side of the door frame to form breaks in the connecting part of the core, each cut being formed by cutting a portion of the outer side wall of the welt part, a portion of the hollow sealing part and a portion of the connecting part of the core.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 10:
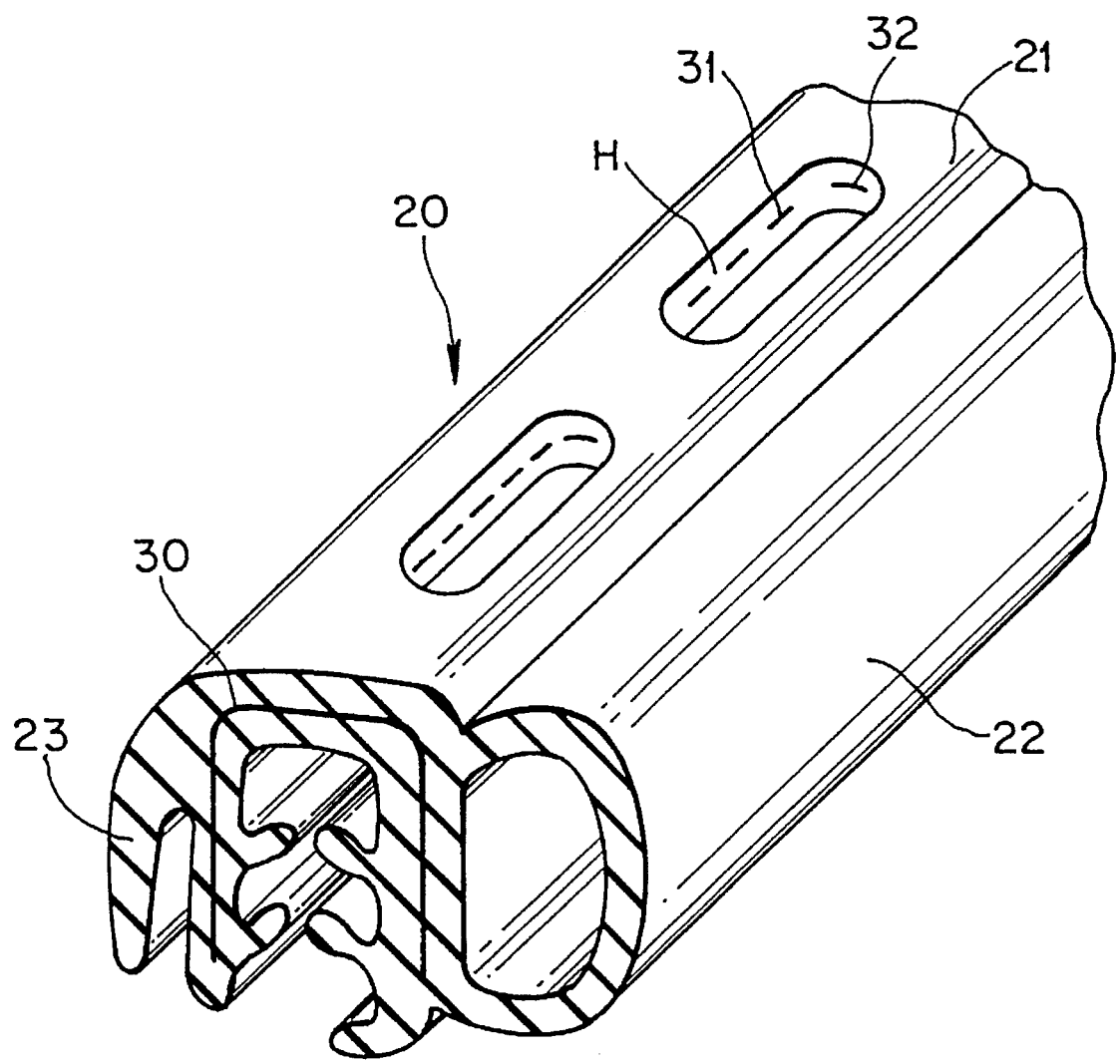
FIG. 10 is a fragmentary perspective view of the weather strip of FIG. 8.
Figure 11:
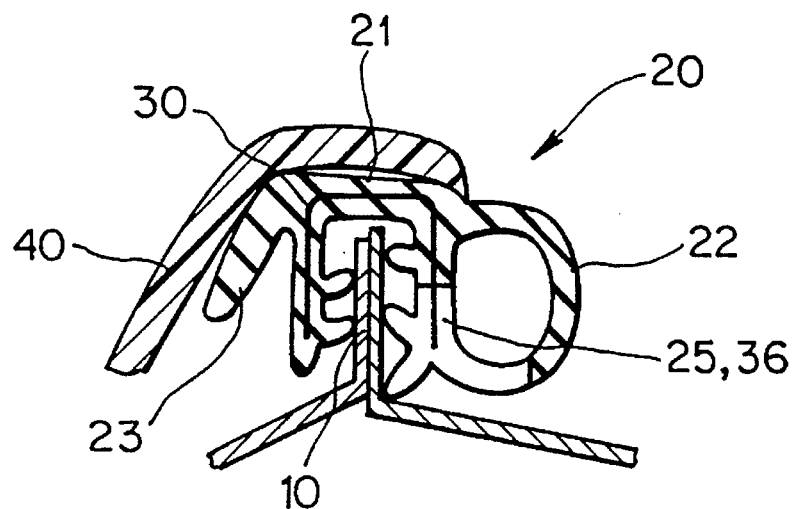
FIG. 11 is a sectional view, similar to FIG. 5, of a weather strip in a second embodiment according to the present invention.

A weather strip 20 in a first embodiment according to the present invention is an integral structure having a welt part 21 of a substantially inverse U-shaped cross section to be put on a flange 10 formed on the body of a car, a hollow sealing part 22 protruding from the outer side wall of the welt part 21, a lip 23 projecting from the inner side wall of the welt part 21, and a fish-bone core 30 having a plurality of U-shaped loops 31 and a linear connecting part 32 successively connecting the U-shaped loops 31, and buried in the welt part 21 with the connecting part 32 extended in the upper wall of the welt part 21. As shown in FIG. 10, slots H of about 10 mm in length and about 6 mm in width are punched in the upper wall of the welt part 21 in a section of the weather strip 20 to be extended on the lower side of the door frame to cut out portions of the connecting part 32 of the core 30 so that breaks are formed in the core 30. The size of the slots H may be such that a portion of the connecting part 32 between the adjacent loops 31 is cut out when the slot H is punched.

Figure 1:
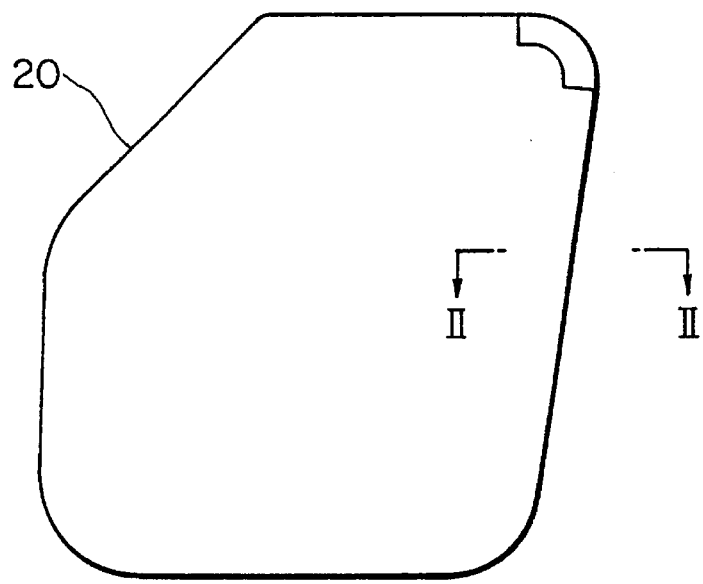
FIG. 1 is a side view of a conventional weather strip.
Figure 2:
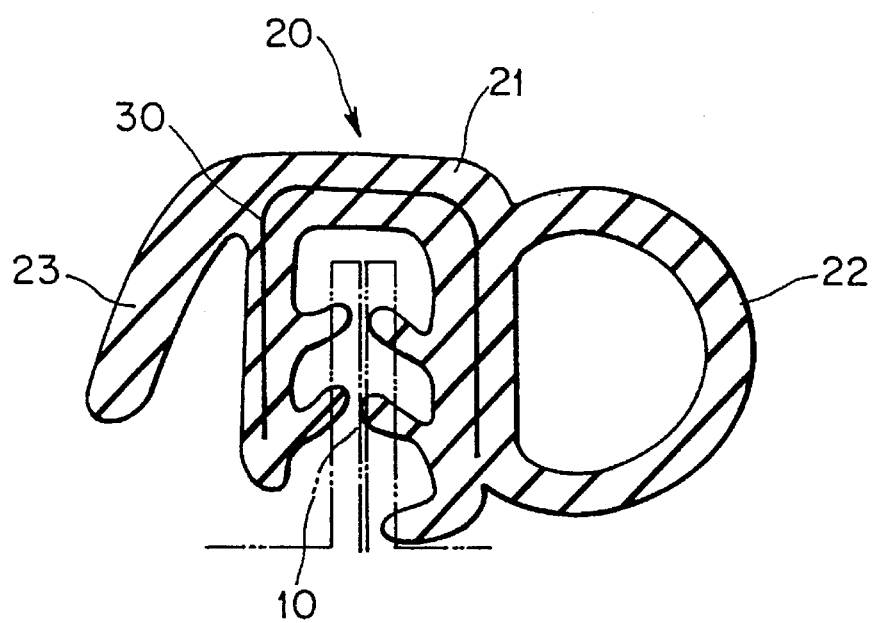
FIG. 2 is a sectional view taken on line II—II in FIG. 1.
Figure 3:
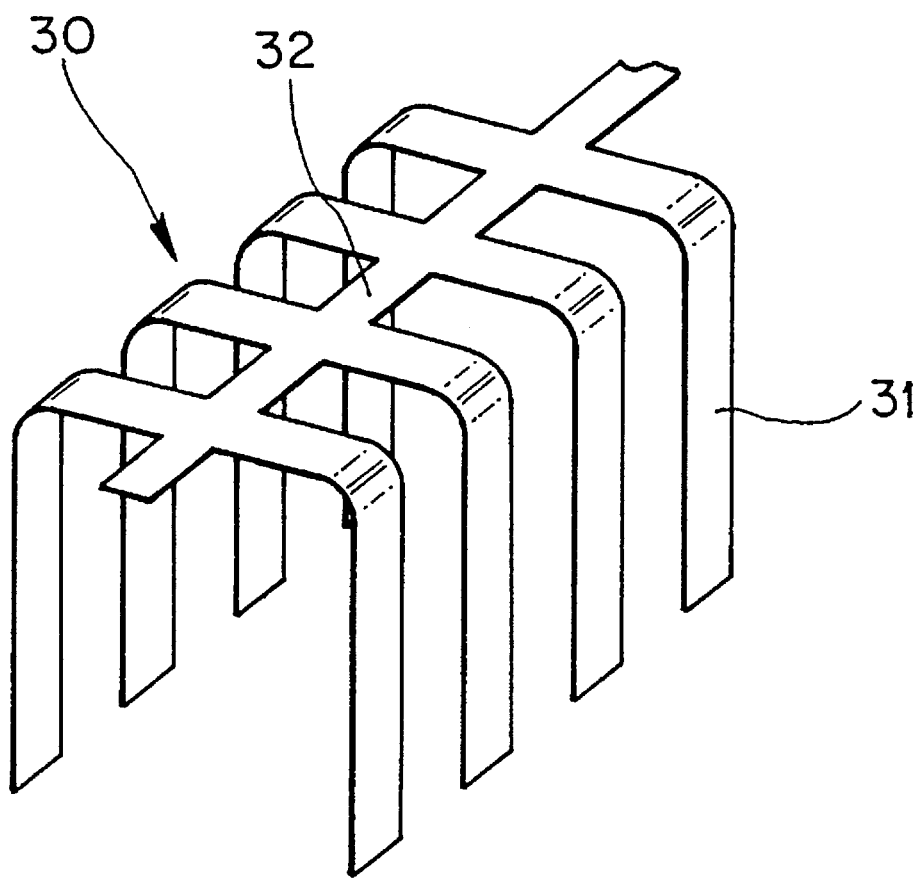
FIG. 3 is a fragmentary perspective view of a fish-bone core incorporated into the weather strip of FIGS. 1 and 8.
Figure 4:
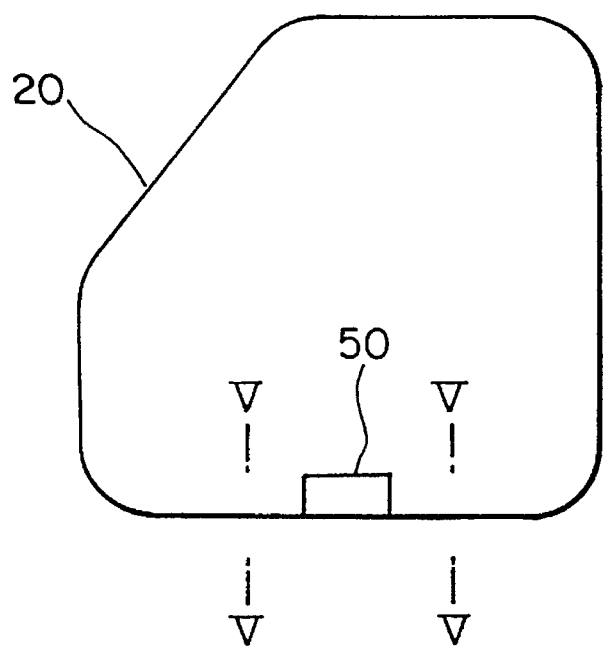
FIG. 4 is a side view of another conventional weather strip.
Figure 5:
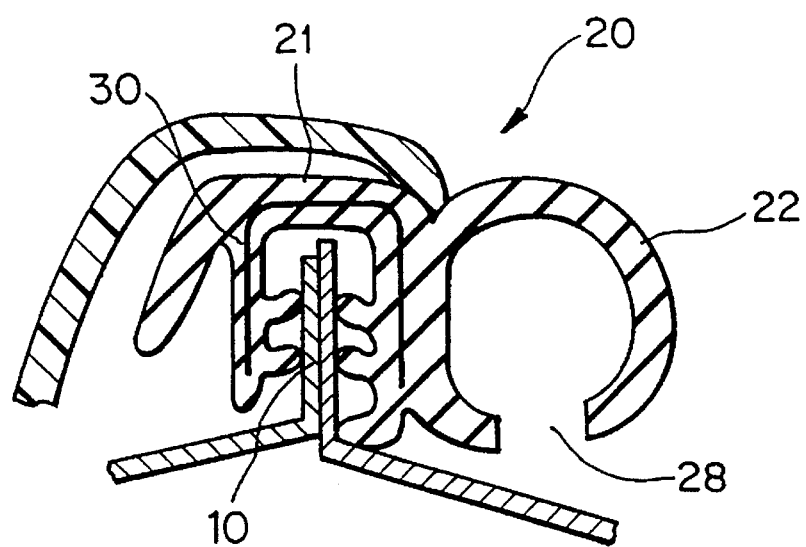
FIG. 5 is a sectional view taken on lines V—V in FIG. 4.
Figure 6:
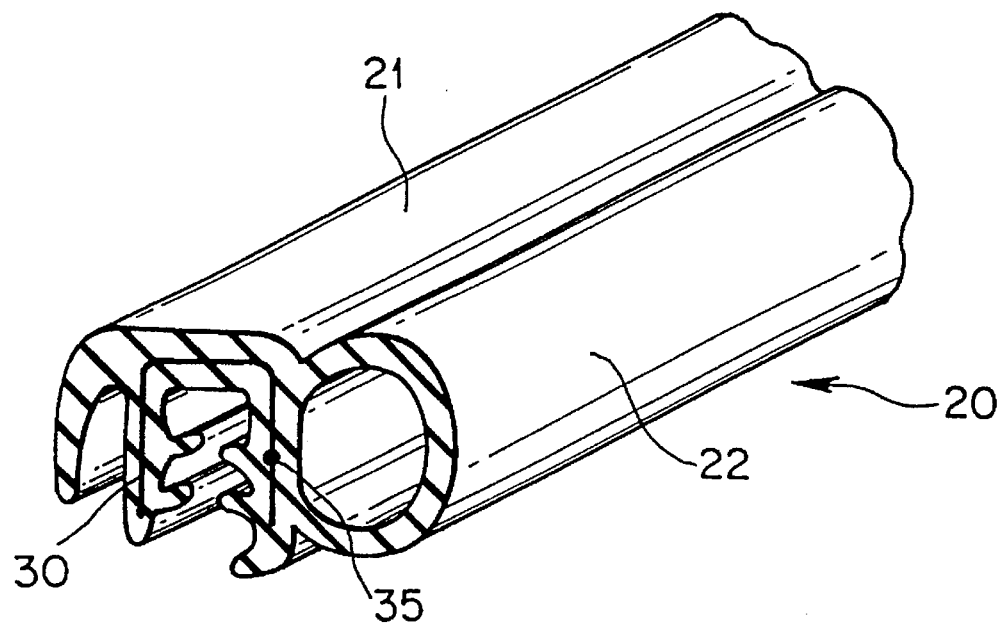
FIG. 6 is a fragmentary perspective view of the weather strip of FIG. 4.
Figure 7:
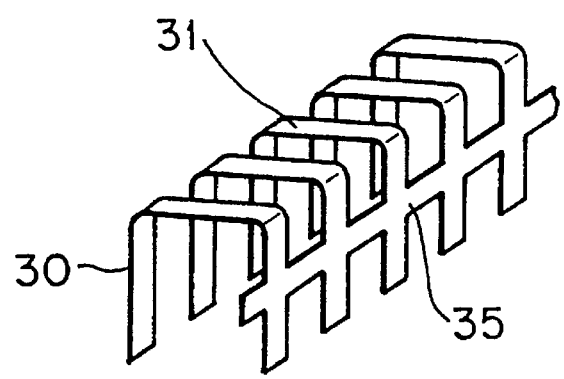
FIG. 7 is a fragmentary perspective view of a one-side core incorporated into the weather strip of FIGS. 4 and 8.
Figure 8:
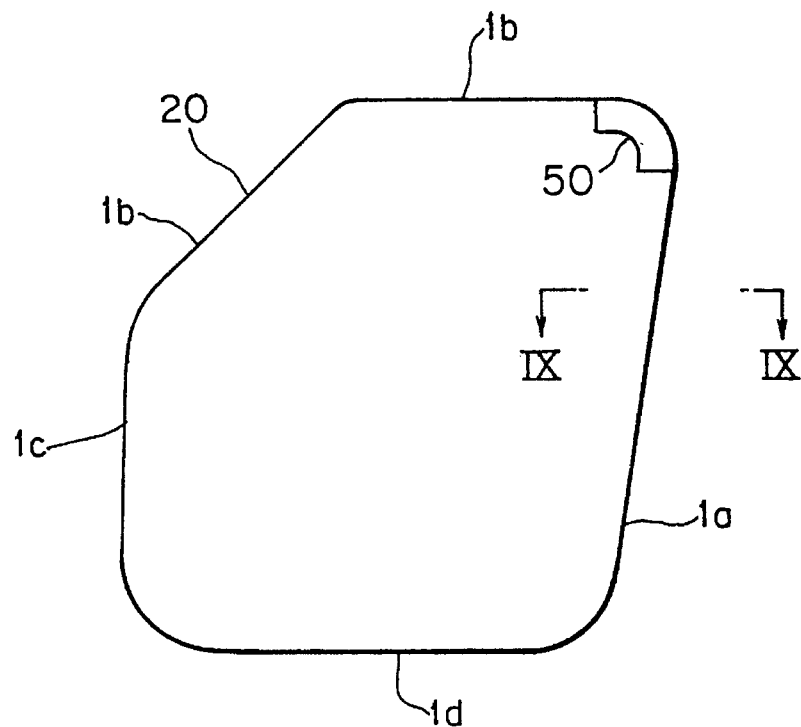
FIG. 8 is side view of a weather strip in a first embodiment according to the present invention.
Figure 9:
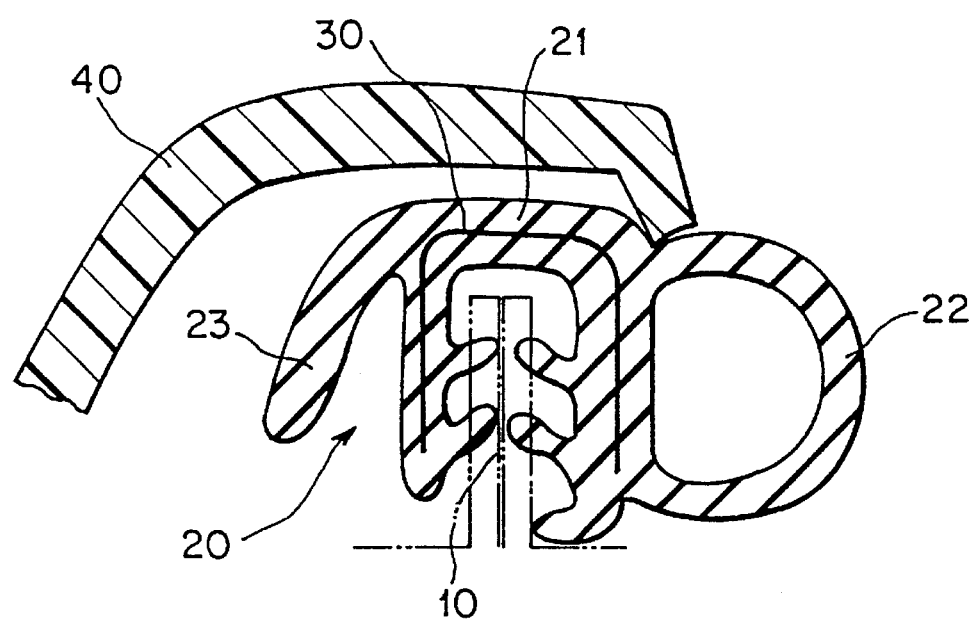
FIG. 9 is a sectional view taken on line IX—IX in FIG. 8.

Referring to FIG. 8, when putting the weather strip 20 on the door frame of a car, first, the weather strip 20 is attached to a rear side 1a (pillar section), to an upper side 1b (roof section), to a front side 1c (hinge section) and, lastly, to a lower side 1d (rocker section). In FIG. 9, indicated at 40 is a scarf plate covering the section of the weather strip 20 attached to the lower side 1d to conceal the same section of the weather strip 20. Each of the slots H formed in the bottom wall of the welt part 21 of the portion of the weather strip 20 put on the lower side 1d allows the portion of the weather strip 20 to be stretched by about 3 mm and to be contracted by about 1 mm, which facilitate work for putting the weather strip 20 on the door frame. Since the weather strip 20 is stretchable and contractible, the tolerance in length of the weather strip 20 may be comparatively large. Since the portion of the weather strip 20 put on the lower side 1d is covered with the scarf plate 40, the slots H are concealed.

A weather strip 20 in a second embodiment according to the present invention will be described hereinafter with reference to FIGS. 4 and 11 to 14. The weather strip 20 is an integral structure having a welt part 21 of a substantially U-shaped cross section to be put on a flange 10 formed on the body of a car, a hollow sealing part 22 protruding from the outer side wall of the welt part 21, a lip 23 projecting from the inner side of the welt part 21, and a one-side core 30 formed in a shape conforming to that of the welt part 21, having a plurality of U-shaped loops 31 and a connecting part 35 successively connecting the leg portions of the U-shaped loops 31, and buried in the welt part 21 with the connecting part 35 extended in the outer side wall of the welt part 21 contiguous with the hollow sealing part 22.

Figure 12:
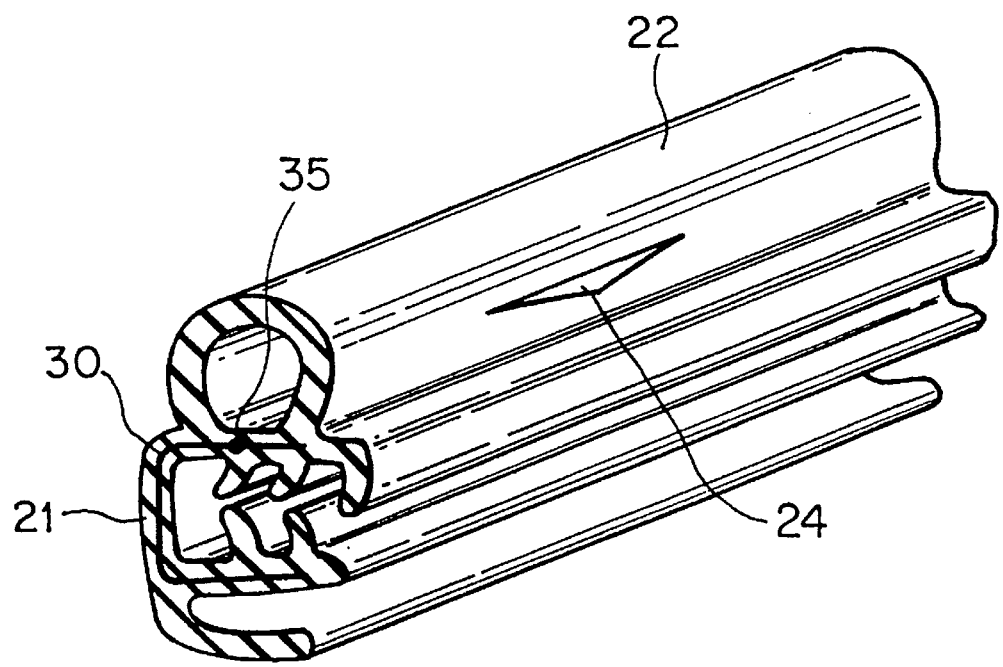
FIG. 12 is a fragmentary perspective view of the weather strip of FIG. 11.
Figure 13:
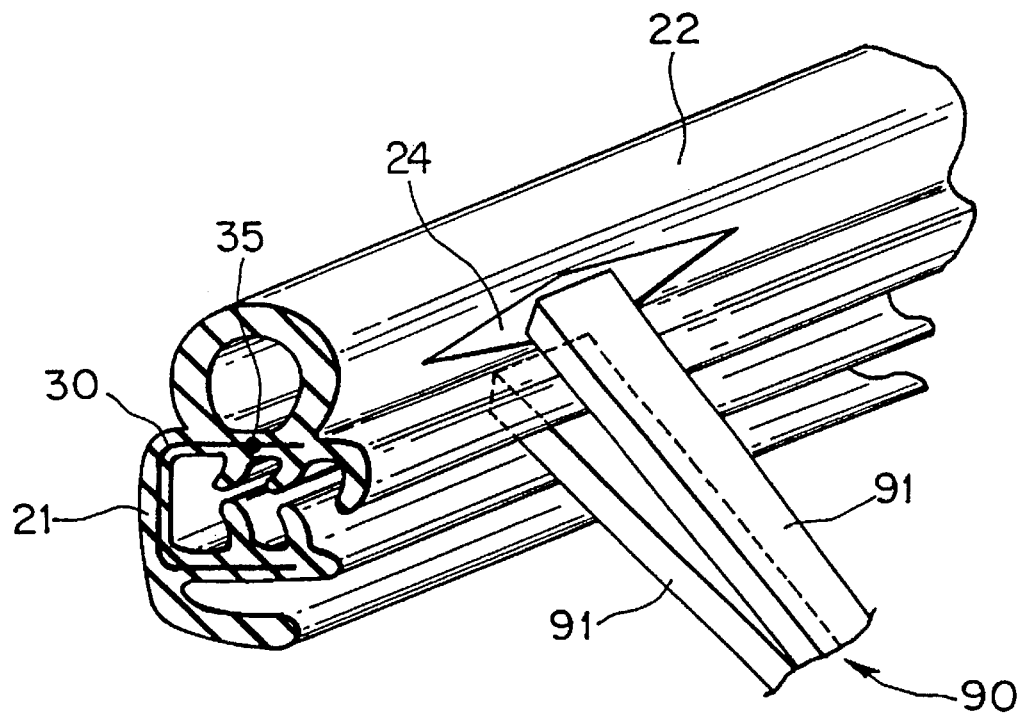
FIG. 13 is a fragmentary perspective view of assistance in explaining a method of forming a slit in the weather strip of FIG. 11.
Figure 14:
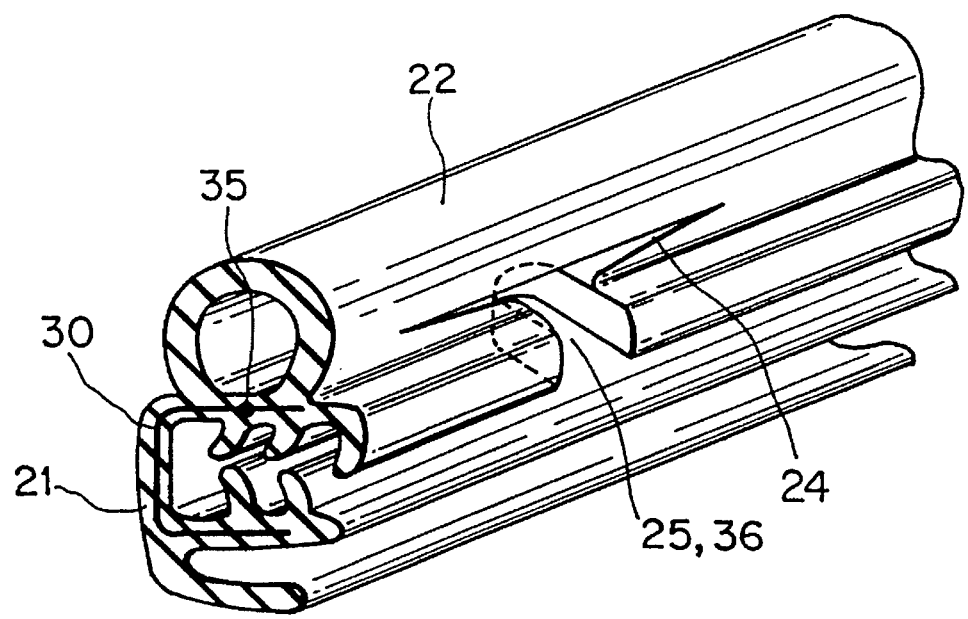
FIG. 14 is a fragmentary perspective view of assistance in explaining a method of forming a cut in the weather strip of FIG. 11.

Referring to FIG. 14, cuts 25 are formed in sections of the weather strip 20 extended on the lower side of the door frame to form breaks 36 in the connecting part 35 of the core 30. Each cut 25 is formed by cutting a portion of the outer side wall of the welt part 21, a portion of the hollow sealing part 22 and a portion of the connecting part 35 of the core 30. Referring to FIG. 12 and FIG. 13, when forming the cut 25, a slit 24 is formed in the hollow sealing part 22, one of the pair of blades 91 of a scissors-like cutting tool 90 is inserted in the slit 24, the other blade 91 is inserted in the groove of the welt part 21, and then the respective corresponding portions of the welt part 21, the hollow sealing part 22 and the connecting part 35 are nipped off with the pair of blades 91. Since the breaks 36 are formed in the connecting part 35, the weather strip 20 provided with the core 30 is stretchable and contractible. Each cut 25 allows the weather strip to be stretched by about 3 mm and to be contracted by about 1 mm, which facilitate work for putting the weather strip 20 on the door frame. Since the weather strip 20 is stretchable and contractible, the tolerance in length of the weather strip 20 may be comparatively large. The cuts 25 serves also as drain holes for draining water collected in the hollow sealing part 22 and hence the weather strip 20 need not be provided with any additional drain holes.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A weather strip for sealing the joint between the door frame of the body of a car and a door put on the door frame, comprising, in an integral structure: a welt part of a substantially U-shaped cross section to be put on a flange formed on the door frame; a hollow sealing part protruding from the outer side wall of the welt part; and a fish-bone core having a plurality of U-shaped loops and a linear connecting part successively connecting the middle portions of the U-shaped loops, and buffed in the welt part with the connecting part thereof extended in the upper wall of the welt part;

slots being punched in the upper wall of the welt part in a section of the weather strip to be extended on the lower side of the door frame to cut out portions of the connecting part of the fish-bone core so that breaks are formed in the connecting part of the fish-bone core.

2. A weather strip according to claim 1, wherein the upper wall of the welt part in the section of the weather strip extended on the lower side of the door frame is covered with a scarf plate.

3. A weather strip for sealing the joints between the door frame of the body of a car and a door put on the door frame, comprising, in an integral structure: a welt part of a substantially U-shaped cross section to be put on a flange formed on the door frame; a hollow sealing part protruding from the outer side wall of the welt part; a molded weather strip joint disposed in a section of the weather strip to be extended on the lower side of the door frame; and a one-side core having a plurality of U-shaped loops and a linear connecting part successively connecting the leg portions of the U-shaped loops, and buried in the welt part with the connecting part thereof extended in the outer side wall of the welt part;

cuts being formed in sections of the weather strip contiguous with the opposite ends of the molded weather strip joint, respectively, and extended on the lower side of the door frame to form breaks in the connecting part of the core;

each cut being formed by cutting a portion of the outer side wall of the welt part, a portion of the hollow sealing part and a portion of the connecting part of the core.

* * * * *

UNITED STATES PATENT AND TRADEMARK OFFICE
CERTIFICATE OF CORRECTION

PATENT NO. : 5 618 608
DATED : April 8, 1997
INVENTOR(S) : Minoru Teishi

It is certified that error appears in the above-indentified patent and that said Letters Patent is hereby corrected as shown below:

Column 4, line 29; change "buffed" to ---buried---.

Signed and Sealed this

Sixteenth Day of September, 1997

Attest:

BRUCE LEHMAN

Attesting Officer

Commissioner of Patents and Trademarks